(12) United States Patent
Kaufhold et al.

(10) Patent No.: US 6,706,807 B2
(45) Date of Patent: Mar. 16, 2004

(54) ALIPHATIC THERMOPLASTIC POLYURETHANES AND USE THEREOF

(75) Inventors: Wolfgang Kaufhold, Köln (DE); Henricus Peerlings, Köln (DE); Hans-Georg Hoppe, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/241,246

(22) Filed: Sep. 10, 2002

(65) Prior Publication Data

US 2003/0083416 A1 May 1, 2003

Related U.S. Application Data

(62) Division of application No. 09/836,793, filed on Apr. 17, 2001.

(30) Foreign Application Priority Data

Apr. 25, 2000 (DE) ......................................... 100 20 163

(51) Int. Cl.⁷ ............................. C08J 3/00; C08K 3/20; C08L 75/00; C08G 18/00; C08G 18/30
(52) U.S. Cl. ...................... 524/590; 524/589; 528/44; 528/76; 528/80; 528/83; 528/84; 528/85
(58) Field of Search ................................. 524/589, 590; 528/44, 76, 80, 83, 84, 85

(56) References Cited

U.S. PATENT DOCUMENTS

| 5,541,277 A | 7/1996 | Mühlfeld et al. ............. 528/28 |
| 6,166,135 A | 12/2000 | Kaufhold et al. ........... 525/123 |

FOREIGN PATENT DOCUMENTS

| CA | 1137690 | 12/1982 |
| CA | 2292020 | 6/2000 |
| DE | 1962533 | 9/1970 |
| DE | 19812160 | 7/1999 |
| DE | 19915932 | 10/2000 |
| EP | 922719 | 6/1999 |

Primary Examiner—Patrick D. Niland
(74) Attorney, Agent, or Firm—Joseph C. Gil; John E. Mrozinski, Jr.

(57) ABSTRACT

A thermoplastic moulding composition that contains an aliphatic thermoplastic polyurethane (TPU) resin is disclosed. The TPU is the product of a reaction of A) a diisocyanate reactant that contains predominantly hexamethylene diisocyanate, and B) a polyol reactant that contains polytetramethylene glycol and C) a chain extending reactant that contains primarily 1,6-hexanediol. The TPU that is further characterized in the equivalence ratio of A to B and NCO index exhibits improved properties.

5 Claims, No Drawings

ALIPHATIC THERMOPLASTIC POLYURETHANES AND USE THEREOF

This application is a Divisional of prior application Ser. No. 09/836,793, filed Apr. 17, 2001.

This invention relates to aliphatic thermoplastic polyurethanes (TPU) prepared from hexamethylene diisocyanate, polytetramethylene glycol and hexanediol with improved properties.

Aromatic thermoplastic polyurethanes (aromatic TPUs) are not light-stable because they are synthesised from aromatic diisocyanates. In coloured mouldings, exposure to light brings about severe yellowing and changes in colour and degree of gloss occur even in black mouldings.

DE-C 42 03 307 describes a thermoplastic polyurethane moulding composition processable in the form of a sinterable powder for the production of grained sintered films, wherein the powder is produced exclusively from linear, aliphatic components. The polyol component is composed of 60 to 80 parts by weight of an aliphatic poly-carbonate diol having a molecular weight $\overline{M}n$ of 2000 and 40 to 20 parts by weight of a polydiol based on adipic acid, hexanediol and neopentyl glycol having a molecular weight $\overline{M}n$ of 2000. Preferably, 1,6-hexamethylene diisocyanate is used in an equivalence ratio of 2.8:1.0 to 4.2:1.0, relative to the polyol mixture, and 1,4-butanediol is used as the chain extender, wherein the equivalence ratio of 1,4-butanediol relative to the polydiol is 1.3:1.0 to 3.3:1.0.

This moulding composition has the disadvantage (especially for optically demanding applications) that it has a tendency to form a white deposit after storage (at room temperature and in particular during accelerated ageing tests, such as the alternating climate test, Arizona test and at elevated temperatures (60–95° C.)). The resultant deposit has the further disadvantage that it cannot readily be wiped off with a cloth.

While formation of the stated deposit is indeed reduced when 1,6-hexanediol is used as chain extender, the deposit reforms on storage at room temperature. However, this deposit may be removed by wiping with a cloth.

The object of the present invention was accordingly to provide light-stable thermoplastic polyurethanes to meet demanding optical requirements, which polyurethanes, after storage at room temperature and after accelerated ageing testing (for example after storage at 60° C.), yield mouldings which exhibit only very slight or no formation of deposits.

This object has been achieved by the thermoplastic polyurethanes according to the invention.

The present invention provides aliphatic, thermoplastic polyurethanes prepared by reacting A) 100 to 60 mol %, preferably 100 to 70 mol %, particularly preferably 100 to 80 mol % of hexamethylene diisocyanate (HDI) and 0 to 40 mol %, preferably 0 to 30 mol %, particularly preferably 0 to 20 mol % of other aliphatic diisocyanates differing from HDI, B) 40 to 100 wt. % of polytetramethylene glycol having a number average molecular weight of 600 to 1600 g/mol and 0 to 60 wt. % of a polyol or polyol mixture differing from polytetramethylene glycol and having a number average molecular weight of 600 to 5000 g/mol and C) 80 to 100 wt. % of 1,6-hexanediol and 0 to 20 wt. % of a chain extender differing from 1,6-hexanediol and having a number average molecular weight of 60 to 500 g/mol.

The inventive thermoplastic polyurethane may be prepared in the presence of

D) optional catalysts and may contain

E) optional further conventional auxiliary substances and additives.

The equivalence ratio of diusocyanate A) to polyol B) is between 1.5:1.0 and 10.0:1.0 and the NCO index (formed from the quotients, multiplied by 100, of the equivalence ratios of isocyanate groups and the sum of the hydroxyl groups of polyol and chain extending agent) characterizing the TPU is 95 to 105.

The present invention furthermore provides aliphatic thermoplastic polyurethanes prepared by reacting A) 100 to 60 mol %, preferably 100 to 70 mol %, particularly preferably 100 to 80 mol % of hexamethylene diisocyanate (HDI) and 0 to 40 mol %, preferably 0 to 30 mol %, particularly preferably 0 to 20 mol % of other aliphatic diisocyanates differing from HDI, B) 70 to 30 wt. % of at least one polyol differing from polytetramethylene glycol and having a number average molecular weight of 600 to 5000 g/mol and 30–70 wt. % of polytetramethylene glycol having a number average molecular weight of 200 to 590 g/mol and C) 80 to 100 wt. % of 1,6-hexanediol and 0 to 20 wt. % of a chain extender having a number average molecular weight of 60 to 500 g/mol, which differs from polytetramethylene glycol having a number average molecular weight of 200 to 590 g/mol and differs from 1,6-hexanediol, wherein the equivalence ratio of diisocyanate A) to polyol B) is between 1.5:1.0 and 10.0:1.0 and wherein the NCO index (formed from the quotients, multiplied by 100, of the equivalence ratios of isocyanate groups and the sum of the hydroxyl groups of polyol and chain extending agent) is 95 to 105.

The preparation of the inventive TPU may be in the presence of D) catalysts and the composition may contain E) conventional additives.

The above sequence of components A to E is no indication of the method by which the TPUs according to the invention are produced. The TPUs according to the invention may be produced by various process variants, wherein these variants are mutually equivalent.

The TPUs according to the invention based on two different aliphatic diisocyanates "A1" (HDI) and "A2" (aliphatic diusocyanate differing from HDI) may, for example, be produced in a reaction process to yield TPU "A1–2". It is, however, also possible in known manner initially to produce TPU "A1" based on the aliphatic diisocyanate "A1" and to produce separately therefrom TPU "A2" based on the aliphatic diisocyanate "A2", wherein the other components B to E are identical. TPU "A1" and TPU "A2" are then mixed in known manner in the desired ratio to yield TPU "A1–2" (for example using extruders or kneaders).

The TPUs according to the invention based on polyol mixtures may likewise be produced by using polyol mixtures (polyol B1 and polyol B2) (for example in mixers) in a reaction process to yield TPU "B1–2". Alternatively, it is also possible in known manner initially to produce TPU "B1" based on polyol "B1" and to produce separately therefrom TPU "B2" based on polyol "B2", wherein the remaining components A and C to E are identical. TPUs "B1" and "B2" are then mixed in known manner in the desired ratio to yield TPU "B1–2" (for example using extruders or kneaders).

Depending upon the requirements placed upon the moulding which is produced from the TPU according to the invention, the hexamethylene diisocyanate (HDI) may be replaced in part by one or more other aliphatic diisocyanates, in particular isophorone diisocyanate (IPDI), 1,4-cyclohexane diisocyanate, 1-methyl-2,4-cyclohexane diisocyanate, 1-methyl-2,6-cyclohexane diisocyanate and isomer mixtures thereof, 4,4'-, 2,4'- and 2,2'-dicyclohexylmethane diisocyanate and isomer mixtures thereof.

In applications having low requirements with regard to light stability, for example dark coloured moulding compositions, proportions (0 to 20 wt. %) of the aliphatic diisocyanate may even be replaced by aromatic diisocyanates. Aromatic diisocyanates are described in *Justus Liebigs Annalen der Chemie*, 562, pp. 75–136. Examples are 2,4-tolylene diisocyanate, mixtures of 2,4- and 2,6-tolylene diisocyanate, 4,4'-, 2,2'- and 2,4'-diphenylmethane diisocyanate, mixtures of 2,4- and 4,4'-diphenylmethane diisocyanate, urethane-modified, liquid 2,4- and/or 4,4'-diphenylmethane diisocyanates, 4,4'-diisocyanato-1,2-diphenylethane and 1,5-naphthylene diisocyanate.

Linear hydroxyl-terminated polyols for instance polyester diol and polyether diol, having an average molecular weight of 600 to 5000 g/mol, preferably of 700 to 4200 g/mol, are used as component B2). As a result of the production process, these frequently contain small amounts of non-linear compounds. For this reason, they are often also referred to as "substantially linear polyols".

Suitable polyester diols may be produced for example from dicarboxylic acids having 2 to 12 carbon atoms, preferably 4 to 6 carbon atoms, and polyhydric alcohols. Dicarboxylic acids which may be considered are, for example: aliphatic dicarboxylic acids, such as succinic acid, glutaric acid, adipic acid, suberic acid, azelaic acid and sebacic acid and aromatic dicarboxylic acids, such as phthalic acid, isophthalic acid and terephthalic acid. The dicarboxylic acids may be used individually or as mixtures, for example in the form of a succinic, glutaric and adipic acid mixture. To produce the polyester diols, it may optionally be advantageous to use, instead of the dicarboxylic acids, the corresponding dicarboxylic acid derivatives, such as carboxylic acid diesters with 1 to 4 carbon atoms in the alcohol residue, carboxylic acid anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols may be used alone or as mixtures. Esters of carbonic acid with the stated diols are also suitable, in particular those having 4 to 6 carbon atoms, such as 1,4-butanediol or 1,6-hexanediol, condensation products of hydroxycarboxylic acids, for example hydroxycaproic acid and polymerisation products of lactones, for example optionally substituted caprolactones. Preferred polyester diols are ethanediol polyadipates, 1,4-butanediol polyadipates, ethanediol/1,4-butanediol polyadipates, 1,6-hexanediol/neopentyl glycol polyadipates, 1,6-hexanediol/1,4-butanediol polyadipates and polycaprolactones. The polyester diols have average molecular weights of from 600 to 5000, preferably 700 to 4200, and may be used individually or mixed together.

Suitable polyether diols may be produced in that one or more alkylene oxides having 2 to 4 carbon atoms in the alkylene residue are reacted with a starter molecule, which contains two attached active hydrogen atoms. Examples of alkylene oxides which may be mentioned are: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides may be used individually, alternately one after the other or as mixtures. Starter molecules which may be considered are, for example: water, amino alcohols, such as N-alkyldiethanolamines, for example N-methyldiethanolarnine, and diols, such as ethylene glycol, 1,3-propylene glycol, 1,4-butanediol and 1,6-hexanediol. Mixtures of starter molecules may optionally also be used. Suitable polyether diols are additionally the hydroxyl group-containing polymerisation products of tetrahydrofuran. Trifunctional polyethers in proportions of from 0 to 30 wt. %, relative to the difunctional polyethers, may also be used, but at most only in such an amount that a melt-processable product is obtained. The substantially linear polyether diols have molecular weights of 600 to 5000, preferably 700 to 4200. They may be used both individually and mixed together.

1,6-Hexanediol is used as the chain extending agent C), optionally blended with up to 20 wt. % of chain extenders having a number average molecular weight of 60 to 500 g/mol and differing from 1,6-hexanediol and from polytetramethylene glycol having a number average molecular weight of 200 to 590 g/mol, preferably aliphatic diols having 2 to 14 carbon atoms, such as for example ethanediol, diethylene glycol, dipropylene glycol and in particular 1,4-butanediol, or (cyclo)aliphatic diamines, such as for example isophoronediamine, ethylenediamine, 1,2-propylenediamine, 1,3-propylenediamine, N-methylpropylene-1,3-diamine, N,N'-dimethylethylenediamine. In addition, relatively small amounts of triols may also be added.

In applications having low requirements with regard to light stability, for example in dark coloured mouldings, proportions of the aliphatic diols and diamines (up to 20 wt. % relative to chain extender) may be replaced by aromatic diols and diamines. Examples of suitable aromatic diols are diesters of terephthalic acid with glycols having 2 to 4 carbon atoms, such as for example terephthalic acid bis-ethylene glycol or terephthalic acid bis-1,4-butanediol, hydroxyalkylene ethers of hydroquinone, such as for example 1,4-di(hydroxyethyl)hydroquinone, and ethoxylated bisphenols. Examples of suitable aromatic diamines are 2,4-tolylenediamine and 2,6-tolylenediamine, 3,5-diethyl-2,4-tolylenediamine and 3,5-diethyl-2,6-tolylenediamine and primary mono-, di-, tri- or tetraalkyl-substituted 4,4-diaminodiphenylmethane.

In addition, conventional monofunctional compounds may also be used in small quantities, for example as chain terminators or mould-release auxiliaries. Examples which may be mentioned are alcohols such as octanol and stearyl alcohol or amines such as butylamine and stearylamine.

The TPUs according to the invention may be produced using known procedures, including belt or extruder processes (GB-A 1,057,018 and DE-A 2,059,570). The process according to PCT/EP 98/07753 is preferred.

A catalyst is preferably used in the continuous production of thermoplastic poly-urethanes by the extruder or belt processes. Suitable catalysts are conventional tertiary amines known according to the prior art, such as for example triethylamine, dimethylcyclohexylamine, N-methylmorpholine, N,N'-dimethylpiperazine, 2-(dimethylaminoethoxy)ethanol, diazabicyclo[2,2,2]octane and the like together with in particular organic metal compounds such as titanic acid esters, iron compounds, tin compounds, for example tin diacetate, tin dioctoate, tin dilaurate or the dialkyltin salts of aliphatic carboxylic acids such as dibutyltin diacetate, dibutyltin dilaurate or the like. Preferred catalysts are organic metal compounds, in particular titanic acid esters, iron or tin compounds. Dibutyltin dilaurate is very particularly preferred.

The TPU may optionally contain UV stabilisers, auxiliary substances and additives. Examples which may be mentioned are lubricants, such as fatty acid esters, the metal soaps thereof, fatty acid amides and silicone compounds, antiblocking agents, inhibitors, stabilisers acting with regard to hydrolysis, heat and discolouration, flame retardants, dyes, pigments, inorganic and organic fillers and reinforcing agents, which may be coated with a size. Further details about the above-mentioned auxiliary substances and additives may be found in the specialist literature, for example J. H. Saunders, K. C. Frisch: "High Polymers", Vol. XVI, Polyurethane, parts 1 and 2, Interscience Publishers 1962 and 1964, R. Gächter, H. Müller (eds.): Taschenbuch der Kunststoff-Additive, $3^{rd}$ edition, Hanser Verlag, Munich 1989 or DE-A-29 01 774.

Additives may be added after polymerisation by compounding or during poly-merisation. Antioxidants and UV stabilisers may, for example, be dissolved in the polyol during polymerisation. Lubricants and stabilisers may, however, also be added in the extruder process, for example in the second section of the screw.

The TPUs according to the invention may be used to produce mouldings, in particular to produce extrudates (for example films) and injection moulded articles. Moreover, the TPUs according to the invention may be used as sinterable powder for producing the mouldings according to the invention in the form of sheet products and hollow articles.

The following Examples are intended to illustrate the invention in greater detail.

EXAMPLES
Production of TPUs and Injection Moulded Sheets

The TPUs were produced continuously as follows:

Component B), which additionally also contains auxiliary substances (see table), chain extender C) and dibutyltin dilaurate were heated with stirring in a boiler to approx. 110° C. and mixed intensively together with component A), which had been heated to approx. 110° C. by means of heat exchangers, by a static mixer made by Sulzer (DN6 with 10 mixing elements and a shear rate of 500 $s^{-1}$) and then conveyed into the feed zone of a screw (ZSK 32). The complete mixture reacted in the extruder until conversion was complete and was then pelletised.

The resultant pellets were dried and several injection moulded sheets were then produced therefrom. Some of the injection moulded sheets were stored in a circulating air drying cabinet at 60° C. and tested for the formation of a surface deposit. Others of the injection moulded sheets were stored at room temperature. Formation of deposits is particularly recognisable from finger prints formed on the moulding. The samples were assessed qualitatively as no measurement method is known.

Test Conditions

Rectangular injection moulded sheets (125 mm×50 mm×2 mm) were produced from the TPUs.

Qualitative assessment (increasing levels of deposits):

none<very slight<slight<distinct<severe<very severe.

| | |
|---|---|
| DBTL: | dibutyltin dilaurate |
| DE2020: | 1,6-hexanediol-based polycarbonate diol with average molecular weight $\overline{M}_n$ = 2000 g/mol |
| PE 225B: | Polybutanediol adipate with average molecular weight $\overline{M}_n$ = 2250 g/mol |
| Therathane 2000 ®: | Polytetrahydrofuran diol with $\overline{M}_n$ = 2000 g/mol (DuPont) |
| Therathane 1000 ®: | Polytetrahydrofuran diol with $\overline{M}_n$ = 1000 g/mol (DuPont) |
| Therathane 650 ®: | Polytetrahydrofuran diol with $\overline{M}_n$ = 650 g/mol (DuPont) |
| Therathane 250 ®: | Polytetrahydrofuran diol with $\overline{M}_n$ = 250 g/mol (DuPont) |
| Acclaim ® 2220: | Polyether polyol with polyoxypropylene/polyoxyethylene units (with approx. 85% primary hydroxyl groups and an average molecular weight $\overline{M}_n$ of approx. 2000 g/mol, Lyondell) |
| HDI: | Hexamethylene diisocyanate |
| Irganox ® 1010: | Tetrakis[methylene-(3,5-di-tert-butyl-4-hydroxyhydro-cinnamate)]methane (Ciba Geigy) |
| Stabaxol ® P200: | Aromatic polycarbodiimide (Rhein-Chemie) |
| 1,4BDO: | 1,4-butanediol |
| 1,6 HDO: | 1,6-hexanediol. |

| | | Composition of TPUs | | | | | |
|---|---|---|---|---|---|---|---|
| | HDI | Polyol 1 | | Polyol 2 | | 1,4BDO | 1,6HDO |
| TPU | moles/g | moles/g | | moles/g | | moles/g | moles/g |
| Comparison 1[1] | 5.09/856 | 1.0/2000 | DE 2020 | 0.43/967 | PE 225 B | 3.76/339 | — |
| Comparison 2[1] | 5.09/856 | 1.0/2000 | DE 2020 | 0.43/967 | PE 225 B | — | 3.76/445 |
| Comparison 3[1] | 3.78/636 | 1.0/2250 | PE 225B | — | — | — | 2.85/337 |
| Comparison 4[1] | 5.39/908 | 1.0/2250 | PE 225 B | 0.43/964 | Acclaim 2220 | — | 4.08/482 |
| Comparison 5[1] | 3.38/569 | 1.0/2000 | Terathane 2000 | — | — | — | 2.45/290 |
| Example 1[1] | 3.25/545 | 1.0/1000 | Terathane 1000 | — | — | — | 2.31/273 |
| Example 2[1] | 5.61/941 | 1.0/1000 | Terathane 1000 | — | — | — | 4.72/557 |
| Example 3[2] | 8.77/820 | 1.0/1250 | PE 225 B | 2.25/1250 | Terathane 1000 | — | 5.71/375 |
| Example 4[2] | 7.9/739 | 1.0/1250 | PE 225 B | 2.31/833 | Terathane 650 | — | 4.76/312 |
| Example 5[2] | 11.52/1077 | 1.0/1250 | PE 225 B | 6.0/833 | Terathane 250 | — | 4.76/312 |

All TPUs were produced with addition of 40 ppm DBTL, relative to the introduced polyols.
[1] These TPUs additionally contain 0.5 wt. % Irganox 1010, relative to TPU.
[2] These TPUs additionally contain 0.5 wt. % Irganox 1010, relative to TPU, and 1 wt. % Stabaxol P 200, relative to PE 225 B.

Results

Formation of deposit on storage at 60° C. after

| TPU | 7 days | 14 days | 28 days | 28 days: removable by wiping with a dry cloth |
|---|---|---|---|---|
| Comparison 1 | very severe | very severe | very severe | no |
| Comparison 2 | none | none | none | — |
| Comparison 3 | none | none | none | — |
| Comparison 4 | none | none | none | — |
| Comparison 5 | none | none | none | — |
| Example 1 | none | none | none | — |
| Example 2 | none | none | none | — |
| Example 3 | none | none | none | — |
| Example 4 | none | none | none | — |
| Example 5 | none | none | none | — |

Formation of deposit on storage at room temperature (20–25° C.) after

| TPU | 1 month | 2 months | 3 months | 3 months: removable by wiping with a dry cloth |
|---|---|---|---|---|
| Comparison 1 | very severe | very severe | very severe | no |
| Comparison 2 | severe | severe | severe | yes |
| Comparison 3 | distinct | severe | severe | yes |
| Comparison 4 | distinct | distinct | distinct | yes |
| Comparison 5 | distinct | distinct | distinct | yes |
| Example 1 | none | none | none | — |
| Example 2 | none | none | none | — |
| Example 3 | none | none | very slight | yes |
| Example 4 | none | none | very slight | yes |
| Example 5 | none | none | very slight | yes |

What is claimed is:

1. A thermoplastic moulding composition comprising thermoplastic polyurethane that is the product of a reaction of A) a diisocyanate reactant that contains
   A1) 100 to 60% of hexamethylene diisocyanate, and optionally
   A2) 0 to 40% of at least one other aliphatic diisocyanate, the % being relative to the molar amount of A), and
B) a polyol reactant that contains
   B1) 70 to 30 percent relative to the weight of B) of at least one polyol different from polytetramethylene glycol and having a number average molecular weight of 600 to 5,000 g/mole and
   B2) 30 to 70 percent relative to the weight of B) of polytetramethylene glycol and having a number average molecular weight of 200 to 590 g/mol, and
C) a chain extending reactant that contains
   C1) 80 to 100% relative to the weight of C, of 1,6-hexanediol, and
   C2) 0 to 20% relative to the weight of C, of at least one member selected from the group consisting of aliphatic diols that differ from C1 and B2, and (cyclo) aliphatic diamines, said member having number average molecular weight of 60 to 500, wherein the equivalence ratio of A to B is 1.5:1.0 to 10.0:1.0, and wherein NCO index is 95 to 105.

2. The composition of claim 1 wherein reaction is catalyzed.

3. The composition of claim 1 further comprising at least one additive selected from the group consisting of UV stabilizer, lubricant, antiblocking agent, inhibitor, hydrolytic stabilizer, heat stabilizer, discoloration stabilizer, flame retardant, dye, pigment, filler and reinforcing agent.

4. A moulded article comprising the composition of claim 1.

5. A process for making a hollow article comprising sintering a powder comprising the composition of claim 1.

* * * * *